US012739020B2

(12) United States Patent
Li et al.

(10) Patent No.: US 12,739,020 B2
(45) Date of Patent: Sep. 15, 2026

(54) SIGNAL RELAY AND INDICATION METHOD AND APPARATUS, RELAY NODE, FIRST NETWORK ELEMENT, AND MEDIUM

(71) Applicant: ZTE CORPORATION, Guangdong (CN)

(72) Inventors: Yong Li, Shenzhen (CN); Yijian Chen, Shenzhen (CN); Jianwu Dou, Shenzhen (CN); Jun Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 267 days.

(21) Appl. No.: 18/579,617

(22) PCT Filed: Aug. 18, 2022

(86) PCT No.: PCT/CN2022/113251

§ 371 (c)(1),
(2) Date: Jan. 16, 2024

(87) PCT Pub. No.: WO2023/030020

PCT Pub. Date: Mar. 9, 2023

(65) Prior Publication Data

US 2024/0340072 A1 Oct. 10, 2024

(30) Foreign Application Priority Data

Sep. 6, 2021 (CN) ......................... 202111038561.7

(51) Int. Cl.
*H04W 52/14* (2009.01)
*H04B 7/155* (2006.01)

(52) U.S. Cl.
CPC ................................ *H04B 7/15507* (2013.01)

(58) Field of Classification Search
CPC .................................................. H04B 7/15507
See application file for complete search history.

(56) References Cited

U.S. PATENT DOCUMENTS 12,021,792 B2 * 6/2024 Li ........................ H04B 7/0456
2010/0210227 A1 * 8/2010 Hwang ................ H04B 7/0671 455/101
2018/0131404 A1 * 5/2018 Zhang ................ H03H 17/0255

(Continued)

FOREIGN PATENT DOCUMENTS

CN 109951826 A 6/2019
CN 112737656 A 4/2021

(Continued)

OTHER PUBLICATIONS

Extended European Search Report for corresponding Application No. EP 22863160.2, dated Jul. 3, 2025, 9 pages.

(Continued)

*Primary Examiner* — Zhiren Qin
(74) *Attorney, Agent, or Firm* — Dority & Manning, P.A.

(57) ABSTRACT

A signal delay method, including: generating a target spatial filter according to received indication information, where the indication information is used to indicate a coefficient of M spatial filters, and M is an integer greater than 1; and relaying a signal between a first network element and a second network element through the target spatial filter.

19 Claims, 2 Drawing Sheets

(56) References Cited

U.S. PATENT DOCUMENTS

| | | | | |
|---|---|---|---|---|
| 2020/0226724 | A1* | 7/2020 | Fang | G06T 5/77 |
| 2020/0358501 | A1* | 11/2020 | Hormis | H04B 7/15528 |
| 2021/0044412 | A1 | 2/2021 | Li et al. | |
| 2021/0105751 | A1 | 4/2021 | Xu et al. | |
| 2022/0417868 | A1* | 12/2022 | Tsai | H04W 52/367 |
| 2023/0262482 | A1* | 8/2023 | Liu | H04B 7/06952<br>370/329 |
| 2023/0370155 | A1* | 11/2023 | VanderMeulen | H04B 7/18513 |
| 2024/0064528 | A1* | 2/2024 | Liu | H04B 7/0626 |

FOREIGN PATENT DOCUMENTS

| | | | |
|---|---|---|---|
| WO | WO2020105832 | A1 | 5/2020 |
| WO | WO 2020/132788 | A1 | 7/2020 |

OTHER PUBLICATIONS

PCT International Search Report and Written Opinion (with English translations) for corresponding PCT Application No. PCT/CN2022/113251, mailed Nov. 11, 2022, 15 pages.

Third Generation Partnership Project (3GPP), “Meeting Report for TSG RAN meeting #92e”, Electronic Meeting, Jun. 14-18, 2021, 184 pages.

Third Generation Partnership Project (3GPP), “Meeting Report for TSG RAN meeting #93e”, Electronic Meeting, Sep. 13-17, 2021, 242 pages.

* cited by examiner

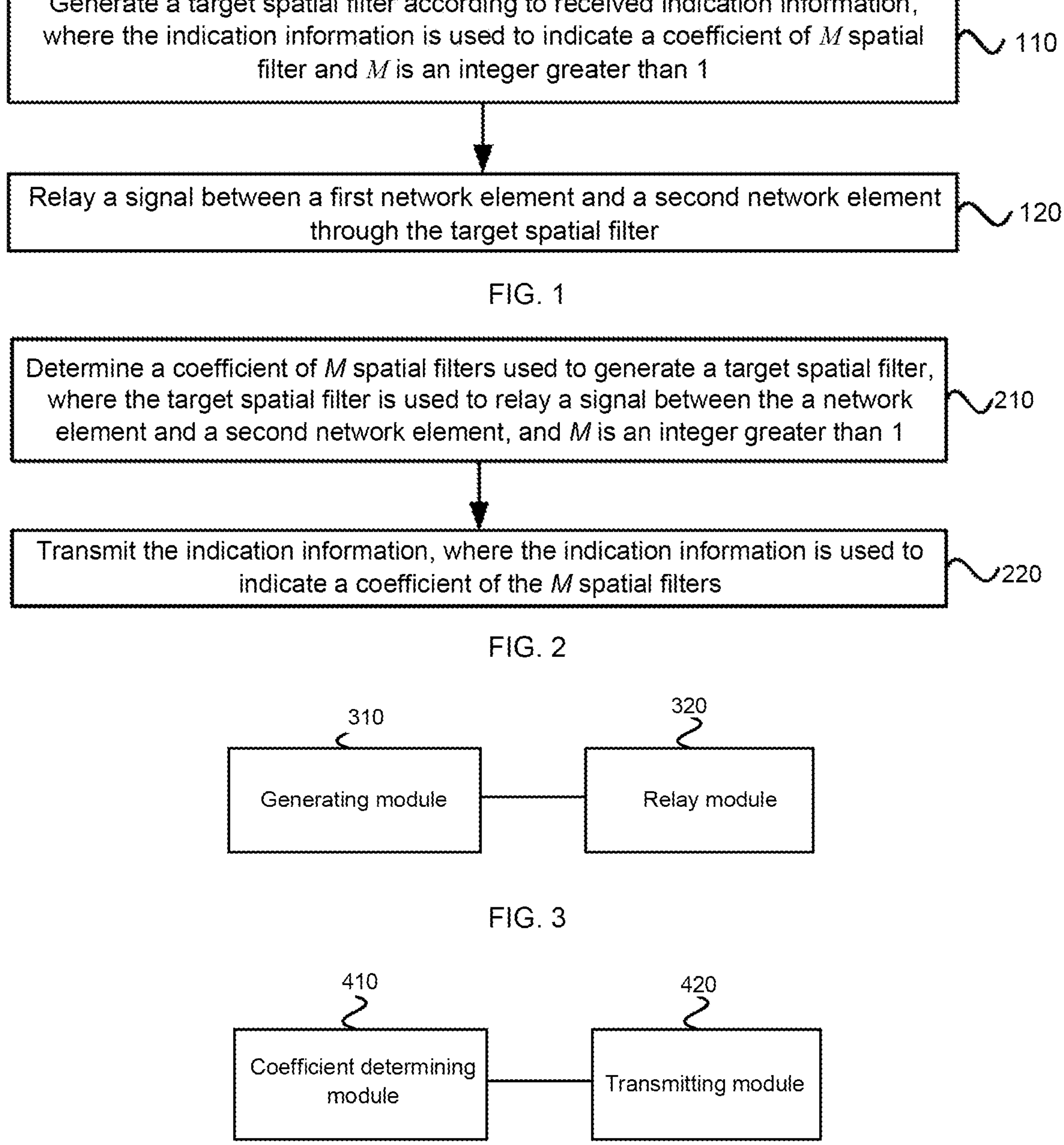
Generate a target spatial filter according to received indication information, where the indication information is used to indicate a coefficient of $M$ spatial filter and $M$ is an integer greater than 1
110
Relay a signal between a first network element and a second network element through the target spatial filter
120
FIG. 1
Determine a coefficient of $M$ spatial filters used to generate a target spatial filter, where the target spatial filter is used to relay a signal between the a network element and a second network element, and $M$ is an integer greater than 1
210
Transmit the indication information, where the indication information is used to indicate a coefficient of the $M$ spatial filters
220
FIG. 2
310
320
Generating module
Relay module
FIG. 3
410
420
Coefficient determining module
Transmitting module
FIG. 4

SIGNAL RELAY AND INDICATION METHOD AND APPARATUS, RELAY NODE, FIRST NETWORK ELEMENT, AND MEDIUM

CROSS REFERENCE TO RELATED APPLICATION(S)

This application is a national phase entry under 35 USC 371 of International Patent Application No. PCT/CN2022/113251 filed on Aug. 18, 2022, the International Patent Application is filed based on Chinese Patent Application with the application No. 202111038561.7, filed on Sep. 6, 2021, and claims priority to the Chinese Patent Application, the entire contents of the International Patent Application and the Chinese Patent Application are incorporated herein by reference.

TECHNICAL FIELD

The present disclosure relates to the technical field of wireless communication networks, and for example, to a signal relay method and apparatus, an indicating method and apparatus, a relay node, a first network element, and a medium.

BACKGROUND

In wireless communication, the quality of communication can be improved by using a relay node to relay a signal between different network elements. For example, if a distance between two network elements is too large, or there is an obstacle between two network elements, a signal between the two network elements may become weak, and therefore, the strength of a signal received by a receiving end can be improved by using a relay node to relay the signal.

During a process of transmitting a signal, the reason that a spatial distribution of energy for transmitting a signal cannot be controlled causes interference to some network elements, and further, affects energy usage efficiency. For example, a relay node (network element A) transmits a signal to network element B, but cannot control a spatial distribution of energy for transmitting a signal and, transmits a signal to network element C. For another example, a relay node (network element A) located at location L (A) transmits a signal to network element B located at location L (B), but cannot control a spatial distribution of energy for transmitting a signal, where a part of energy of the signal is transmitted to a network element located at location L (C), and therefore, network element C located at location L (C) is interfered with, and the more energy transmitted to network element C located at location L (C), the greater the interference to the network element C located at location L (C). For another example, a relay node (network element A) located at location L (A) transmits a signal to network element B located at location L (B), but cannot control a spatial distribution of energy of the signal and does not transmit the energy of the signal to the network element B located at location L (B), or transmits only a small part of the energy to the network element B at location L (B), so the energy usage efficiency of the signal is low.

Similarly, during a process of receiving a signal, the reason that a spatial distribution of energy for receiving a signal cannot be controlled also causes interference to a network element located at the location of the relay node, and further, affects energy usage efficiency. For example, a relay node (network element A) receives a signal transmitted by a network element B, but cannot control a spatial distribution of energy for receiving a signal, and receives a signal transmitted by a network element C. For another example, a relay node (network element A) located at location L (A) receives a signal transmitted by a network element B located at location L (B), but cannot control spatial distribution of energy for receiving a signal, where a part of the energy of a signal transmitted by a network element C located at location L (C) is received, so a network element A located at location L (A) is interfered with, and the more energy of received signal transmitted by network element C, the greater interference to the network element A located at location L (A). For another example, a relay node (network element A) located at location L (A) receives a signal transmitted by a network element B located at location L (B), but cannot control a spatial distribution of energy for receiving a signal, and does not receive energy of a signal transmitted by a network element B located at location L (B), or receives only a small part of the energy of the signal transmitted by the network element B located at location L (B), so the energy usage efficiency of the signal is low.

To sum up, a relay node does not have an ability to control a spatial distribution of energy for transmitting a signal and an ability to control a spatial distribution of energy for receiving a signal, resulting in low reliability and low energy efficiency of relaying.

SUMMARY

The present disclosure provides a signal relay method and apparatus, an indicating method and apparatus, a relay node, a first network element, and a medium, so as to improve the reliability and energy efficiency of a signal relay.

Embodiments of the present disclosure provide a signal relay method, including:

- generating a target spatial filter according to received indication information, where the indication information is used to indicate a coefficient of M spatial filters, and M is an integer greater than 1; and
- relaying a signal between a first network element and a second network element through the target spatial filter.

The embodiments of the present disclosure provide an indicating method, including:

- determining a coefficient of M spatial filters used to generate a target spatial filter, where the target spatial filter is used to relay a signal between a first network element and a second network element, and M is an integer greater than 1; and
- transmitting indication information, where the indication information is used to indicate the coefficient of the M spatial filters.

The embodiments of the present disclosure provide a signal relay apparatus, including:

- a generating module, configured to generate a target spatial filter according to received indication information, where the indication information is used to indicate a coefficient of M spatial filters, and M is an integer greater than 1; and
- a relay module, configured to relay a signal between a first network element and a second network element through the target spatial filter.

The embodiments of the present disclosure provide an indicating apparatus, including:

- a coefficient determining module, configured to determine a coefficient of M spatial filters used to generate a target spatial filter, where the target spatial filter is used to relay a signal between a first network element and a second network element, and M is an integer greater than 1; and a transmitting module, configured to transmit indication information, where the indication information is used to indicate the coefficient of the M spatial filters.

The embodiments of the present disclosure provide a relay node, including: a memory, a processor, and a computer program stored on the memory and runnable on the processor; the processor, upon executing the program, implements the signal relay method as described above.

The embodiments of the present disclosure provide a first network element, including: a memory, a processor, and a computer program stored on the memory and runnable on the processor; the processor, upon executing the program, implements the indicating method as described above.

The embodiments of the present disclosure provide a computer-readable storage medium storing a computer program, the program, upon being executed by a processor, implements the signal relay method or the indicating method as described above.

BRIEF DESCRIPTION OF THE DRAWINGS

FIG. 1 is a flowchart of a signal relay method provided by an embodiment;

FIG. 2 is a flowchart of an indicating method provided by an embodiment;

FIG. 3 is a structural schematic diagram of a signal relay apparatus provided by an embodiment;

FIG. 4 is a structural schematic diagram of an indicating apparatus provided by an embodiment;

DETAILED DESCRIPTION

Figure 5:
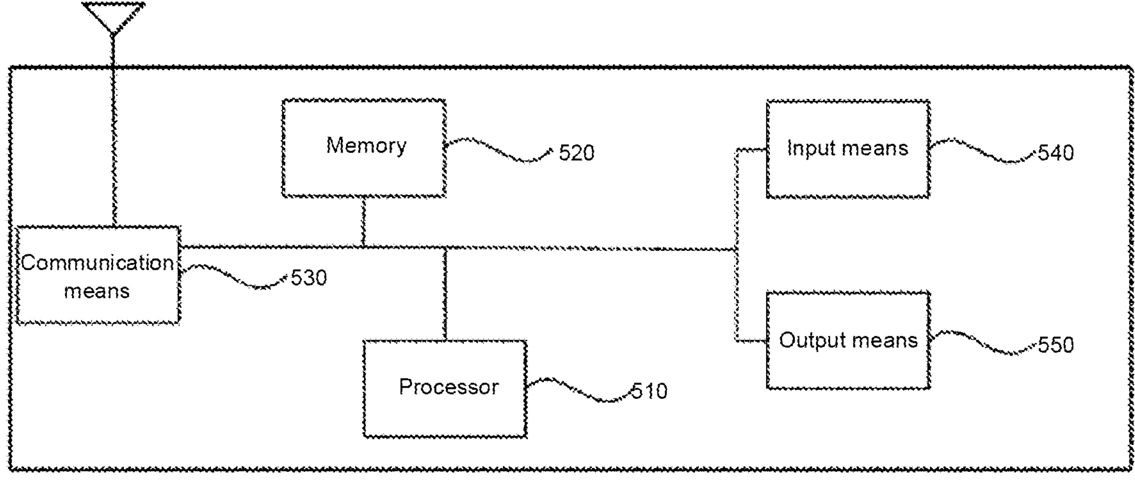
FIG. 5 is a schematic diagram of a hardware structure of a relay node provided by an embodiment.

The present disclosure is described below in combination with the drawings and embodiments. It can be understood that the specific embodiments described herein are only used to explain the present disclosure and not to limit the present disclosure. It should be noted that the embodiments in the present disclosure and features in the embodiments may be arbitrarily combined with each other without conflict. In addition, it should be also noted that, for convenience of description, only a part related to the present disclosure but not the entire structure is shown in the drawings.

In the present disclosure, the controlling of a spatial distribution of energy for transmitting a signal, and the controlling of a spatial distribution of signal energy reception are collectively referred to as the controlling of a spatial distribution of energy of a signal. A first network element may transmit a signal to a second network element, or a first network element may receive a signal from a second network element, and a relay node is used to relay a signal between the first network element and the second network element. If the relay node does not have an ability to control a spatial distribution of energy of a signal, the reliability and energy efficiency of relaying will be low. Herein, the relay node is a network element with a relay function; the first network element may be a base station, an access point, a terminal, or another network element with a relay function, etc., and the second network element may be a base station, an access point, a terminal or may be another network element with a relay function, etc.

For a relay node, it is necessary to enable the relay node to control a spatial distribution of energy of a signal. Controlling a spatial distribution of energy of a signal may include one or more of: controlling a spatial distribution of a power for transmitting a signal, controlling a spatial distribution of a power for receiving a signal, controlling a spatial distribution of energy for transmitting a signal, controlling a spatial distribution of energy for receiving a signal, controlling a distribution of a spatial dimension of energy for transmitting a signal, controlling a distribution of a spatial dimension of energy for receiving a signal, controlling a distribution of a spatial location of energy for transmitting a signal, controlling a distribution of a spatial location of energy for receiving a signal, etc.

In this embodiment, the way for a relay node to control a spatial distribution of energy of a signal is of using a spatial filter to control a spatial distribution of energy of a signal. For example, a spatial filter is a vector. An element in the vector applies to a working unit of a relay node to control a spatial distribution of energy of a signal, where one element in the vector can apply to a working unit, or multiple working units, or a working unit group, or multiple working unit groups of a network element. For another example, a spatial filter is a working unit or working unit group that can generate a spatial distribution of specific energy, and such a working unit or a working unit group is used to control a spatial distribution of energy of a signal, where a spatial distribution for generating specific energy can be a specific spatial distribution of generating energy for transmitting a signal, or a specific spatial distribution of generating energy for receiving a signal. A working unit may refer to a unit that controls an antenna to receive or transmit a signal.

A beam refers to a manner of a spatial distribution of energy of a signal, based on which a relay node transmits or receives a signal. Generating a spatial filter may also be understood as generating a beam. Using a generated spatial filter to relay a signal may also be understood as generating a beam to relay a signal, that is, generating a manner of a spatial distribution of energy of a signal is used to transmit or receive a signal.

On this basis, generating a new spatial filter for transmitting or receiving a signal enables the relay node to have an ability to control a spatial distribution of energy of a signal.

FIG. 1 is a flowchart of a signal relay method provided by an embodiment. The method may be applied to a relay node. A relay node may be a repeater (Relay or Repeater), an intelligent panel (can also be referred as an Intelligent Surface), or a network element with a relay function, etc. As shown in FIG. 1, step 110 and step 120 are provided in this embodiment.

In step 110, a target spatial filter is generated according to received indication information, where the indication information is used to indicate a coefficient of M spatial filters, and M is an integer greater than 1.

In step 120, a signal between a first network element and a second network element is relayed through the target spatial filter.

In this embodiment, the relay node has M spatial filters. The first network element transmits the indication information to the relay node to indicate a coefficient corresponding to the M spatial filters. The relay node receives the indication information of the first network element, and based on the indication information, generates a target spatial filter applied with a coefficient, and relays a between the first network element and the second network element through the generated target spatial filter. The target spatial filter applied with the coefficient is a spatial filter pointing to a new direction relative to the M spatial filters. The first network element indicates the coefficient of the M spatial filters, and the relay node generates a target spatial filter pointing to a new direction according to the indication information, such that the energy of for transmitting a signal or receiving a signal can be concentrated on the second network element, which can avoid interference to or from network elements in other directions.

There are two ways to generate a target spatial filter according to M spatial filters and a corresponding coefficient of each spatial filter.

One way is that: each spatial filter of M spatial filters of the relay node is applied with a coefficient, and the M spatial filters applied with coefficients jointly constitute a new spatial filter, i.e., the target spatial filter. The M spatial filters applied with coefficients are jointly used to relay a signal between the first network element and the second network element, where the effect is equivalent to using a new spatial filter to relay the signal between the first network element and the second network element. In this case, M electromagnetic waves propagate in total, and the result of the superposition of the M electromagnetic waves is equivalent to the propagation of a new electromagnetic wave.

Another way is that: each spatial filter of the M spatial filters of the relay node is applied with a coefficient, and a sum of the M spatial filters applied with coefficients is the target spatial filter. The relay node relays a signal between the first network element and the second network element by using a newly generated target spatial filter.

One way that the indication information indicates the coefficient of the M spatial filters is that: the indication information includes the coefficient of the M spatial filters. For example, the indication information includes M coefficients, where each coefficient corresponds to a spatial filter. Another way that the indication information indicates the coefficient of the M spatial filters is that: the indication information includes a coefficient reference value and a coefficient relative value of the M spatial filters, and a coefficient of each spatial filter is an operation result of a corresponding coefficient relative value corresponding to the respective spatial filter and a coefficient reference value.

The signal relay method of this embodiment generates a target spatial filter for transmitting or receiving a signal, such that the relay node has an ability to control a spatial distribution of energy of a signal, and the energy of transmitting a signal or receiving a signal in the relay process is concentrated on the second network element, which can avoid interference to or from network elements in other directions, thereby improving the energy efficiency and reliability of signal relaying.

In an embodiment, the indication information includes indicating N spatial filters out of the M spatial filters, and N is a non-negative integer less than or equal to M; a coefficient of a spatial filter except the N spatial filters among the M spatial filters is a first default value; and a coefficient of the N spatial filters is the second default value or a specified value of the first network element.

In this embodiment, in the indication information, N spatial filters are indicated from the M spatial filters. A coefficient of M-N spatial filter(s) that is/are not indicated is first default value. A coefficient of the indicated N spatial filters is the second default value, or the specified value of the first network element.

The indication information may not include a coefficient of M-N spatial filter(s) that is/are not indicated and a coefficient of M-N spatial filter(s) that is/are the first default value. For example, the first default value is a value specified in the protocol of the coefficient of a spatial filter that is not indicated. For another example, the first default value is a value where the first network element and the relay node negotiate in advance of a coefficient of a spatial filter that is not indicated.

The indication information may not include an indicated coefficient of the N spatial filters. The indicated coefficient of the N spatial filters is a second default value. For example, the second default value is a value specified in the protocol of the coefficient of a spatial filter that is indicated. For another example, the second default value is a value where the first network element and the relay node negotiate in advance of a coefficient of a spatial filter that is indicated.

The indication information may include an indicated coefficient of the N spatial filters, that is, the indication information includes N coefficients. Each coefficient of N coefficients corresponds to an indicated spatial filter, that is, a coefficient of the N spatial filters is a specified value. For example, in the indication information, N=2 spatial filters are indicated from M=4 spatial filters, and include a coefficient of the indicated 2 spatial filters. For another example, in the indication information, N=4 spatial filters are indicated from M=6 spatial filters, and include a coefficient of the indicated 4 spatial filters.

In this embodiment, the M spatial filters are divided into two parts. The first part is N spatial filters among the M spatial filters, which are indicated from the M spatial filters through the indication information. The second part is the remaining M-N spatial filter(s). A coefficient of the spatial filters of the first part is the second default value, and a coefficient of the spatial filter(s) of the second part is the first default value.

In one embodiment, in this embodiment, the M spatial filters are divided into two parts. The first part is the N spatial filters among the M spatial filters, which are indicated from the M spatial filters through the indication information. The second part is the remaining M-N spatial filter(s). A coefficient of the spatial filters of the first part is a specified value, and a coefficient of the spatial filter(s) of the second part is the first default value.

Through the above manners, the overhead of the indication information indicating a coefficient of the M spatial filters can be saved, and the target spatial filter is indicated by indicating the coefficient of the M spatial filters, such that the relay node relays a signal between the first network element and the second network element by using the target spatial filter.

In an embodiment, the first default value is zero.

In an embodiment, the second default value may be 1.

In an embodiment, the second default value may be a function of the first default value. For example, the second default value is a linear function of the first default value, or the second default value is a quadratic power function of the first default value.

In an embodiment, the signal relay method further includes step 100: reporting a number of to-be-indicated spatial filters to the first network element.

In this embodiment, before receiving the indication information, the relay node also reports to the first network element, a number N of the spatial filters that need to be indicated, such that the first network element can indicate N spatial filters from the M spatial filters according to the above report, thereby the coefficient of M spatial filters is determined. For example, the first network element determines which coefficients of N spatial filters take as a second default value and which coefficient(s) of M-N spatial filter take(s) as a first default value according to a number N of spatial filters reported by the relay node. For another example, the first network element determines which coefficient(s) of M-N spatial filter(s) take(s) as the first default value and which coefficients of N spatial filter(s) is/are specified in the indication information by the first network element according to a number of to-be-indicated spatial filters) reported by the relay node. On this basis, a coefficient of the spatial filters used to generate the target spatial filter is determined, such that the energy for transmitting a signal or receiving a signal is concentrated on the second network element.

In an embodiment, the indication information includes a coefficient reference value and a coefficient relative value corresponding to each spatial filter.

In this embodiment, the indication information includes a coefficient reference value $c^{(r)}$ and M coefficient relative values, where a coefficient relative value of spatial filter i is denoted as $c'_i$, then the coefficient $c'_i$ of spatial filter i is $c^{(r)} \cdot c'_i$, where i=0, 1, 2, . . . , M−1. For example, if the indication information includes a coefficient reference value $c^{(r)}$, and M coefficient relative values $c'_0, c'_1, \ldots, c'_{M-1}$, then the coefficients of the M spatial filters are $c^{(r)}c'_0$, $c^{(r)}c'_1$, $c^{(r)}c'_{M-1}$, respectively. On this basis, a size of the coefficients of M spatial filters can be indicated by a coefficient reference value $c^{(r)}$.

In an embodiment, the coefficient reference value is associated with one of: a power of the target spatial filter; a power amplification factor of the target spatial filter to a signal; a power of each of the M spatial filters; a sum of a power of the M spatial filters.

In this embodiment, the indication information includes a coefficient reference value $c^{(r)}$. The coefficient reference value $c^{(r)}$ may be used to indicate a power of the target spatial filter. For example, the power of the target spatial filter may be $|c^{(r)}|$, or $|c^{(r)}|$, or $|c^{(r)}|^2/M$, or $M \cdot |c^{(r)}|^2$. Alternatively, the coefficient reference value $c^{(r)}$ may be used to indicate a power amplification factor of the target spatial filter to a relay signal, for example, the power amplification coefficient to the relay signal is $c^{(r)}$, or $|c^{(r)}|^2$, or $|c^{(r)}|^2/M$, or $M \cdot |c^{(r)}|^2$. Alternatively, the coefficient reference value $c^{(r)}$ may also be used to indicate a power of each spatial filter among the M spatial filters, for example, a power of each spatial filter is $c^{(r)}$, or $|c^{(r)}|^2$. Alternatively, the coefficient reference value $c^{(r)}$ indicates a sum of a power of the M spatial filters, for example, the sum of the power of the M spatial filters is $c^{(r)}$, or $|c^{(r)}|^2$ or $|c^{(r)}|^2/M$, or $M \cdot |c^{(r)}|^2$. $|\bullet|$ represents taking an absolute value, or taking a module.

In an embodiment, generating a target spatial filter according to received indication information includes: performing processing on each spatial filter according to a coefficient of each spatial filter, where the M spatial filters that have been processed jointly constitute the target spatial filter.

In this embodiment, each spatial filter of M spatial filters of the relay node is applied with a coefficient, and the target spatial filter can be obtained by the joint action of the coefficient on the M spatial filters applied with coefficients. For example, the M spatial filters are denoted as $V_0$, $V_1, \ldots V_i, \ldots, V_{M-1}$, respectively, and coefficients of the M spatial filters indicated by the first network element and received by the relay node are denoted as $c_0, c_1, \ldots c_i, \ldots, c_{M-1}$, respectively, where the coefficient $c_i$ corresponds to the spatial filter $V_i$. The M spatial filters applied with coefficients are denoted as $c_0V_0, c_1V_1, \ldots, c_{M-1}V_{M-1}$, respectively, and the M spatial filters $c_0V_0, c_1V_1, \ldots, c_{M-1}V_{M-1}$, applied with coefficients act together to obtain the target spatial filter, where i=0, 1, 2, . . . , M−1. The M spatial filters $c_0V_0, c_1V_1, \ldots, c_{M-1}V_{M-1}$ applied with coefficients act together, that is, the M spatial filters $c_0V_0, c_1V_1, \ldots, c_{M-1}V_{M-1}$ applied with coefficients are jointly used to relay a signal between the first network element and the second network element. In this case, it is equivalent that a new spatial filter (i.e., the target spatial filter) relays a signal between the first network element and the second network element. The M spatial filters $c_0V_0, c_1V_1, \ldots, c_{M-1}V_{M-1}$ applied with coefficients jointly relay a signal between the first network element and the second network element, M electromagnetic waves propagate in total, and the result of the mutual superposition of the M electromagnetic waves is equivalent to the propagation of a new electromagnetic wave.

For another example, the M spatial filters are denoted as $V_0, V_1, \ldots V_i, \ldots, V_{M-1}$, respectively, and coefficients of the M spatial filters indicated by the first network element and received by the relay node are denoted as $c_0, c_1, \ldots c_i, \ldots, c_{M-1}$, respectively, where the coefficient $c_i$ corresponds to the spatial filter $V_i$; the M spatial filters applied with coefficients are expressed as $kc_0V_0, kc_1V_1, \ldots, kc_{M-1}V_{M-1}$, respectively; the M spatial filters $kc_0V_0$, $kc_1V_1, \ldots, kc_{M-1}, V_{M-1}$ applied with coefficients act together to obtain the target spatial filter, where k is a real number, i=0, 1, 2, . . . , M−1. The M spatial filters $kc_0V_0$, $kc_1V_1, \ldots, kc_{M-1}V_{M-1}$ applied with coefficients act, that is, the M spatial filters $kc_0V_0, kc_1V_1, \ldots, kc_{M-1}V_{M-1}$ applied with coefficients act jointly relay a signal between the first network element and the second network element. In this case, it is equivalent that a new spatial filter(i.e., the target spatial filter) relays a signal between the first network element and the second network element. The M spatial filters $kc_0V_0, kc_1V_1, \ldots, kc_{M-1}V_{M-1}$ applied with coefficients jointly relay a signal between the first network element and the second network element, M electromagnetic waves propagate in total, and the result of the mutual superposition of the M electromagnetic waves is equivalent to the propagation of a new electromagnetic wave.

In an embodiment, generating the target spatial filter according to the received indication information includes: combining the M spatial filters according to a coefficient of each spatial filter, so as to obtain the target spatial filter.

For example, each spatial filter of M spatial filters of the relay node is applied with a coefficient, and the sum of the M spatial filters applied with coefficients is the target spatial filter. For example, the M spatial filters are denoted as $V_0$, $V_1, \ldots V_i, \ldots, V_{M-1}$, respectively, and coefficients of the M spatial filters indicated by the first network element and received by the relay node are denoted as $c_0, c_1, \ldots c_i, \ldots, c_{M-1}$, respectively, where the coefficient $c_i$ corresponds to the spatial filters $V_i$; the M spatial filters applied with coefficients are $c_0V_0, c_1V_1, \ldots, c_{M-1}V_{M-1}$. The sum $$\sum_{i=1}^{M-1} c_i V_i$$

of the M spatial filters applied with coefficients is the target spatial filter, where i=0, 1, 2, . . . , M−1. The relay node relays a signal between the first network element and the second network element by using the target spatial filter $$\sum_{i=1}^{M-1} c_i V_i.$$

For another example, the M spatial filters are denoted as $V_0, V_1, \ldots V_i, \ldots, V_{M-1}$, respectively; coefficients of the M spatial filters indicated by the first network element and received by the relay node are denoted as $c_0, c_1, \ldots c_i, \ldots, c_{M-1}$, respectively; the coefficient $c_i$ corresponds to the spatial filters V; the M spatial filters applied with coefficients are $kc_0V_0, kc_1V_1, \ldots, kc_{M-1}V_{M-1}$; the sum $$\sum_{i=1}^{M-1} kc_i V_i$$

of the M spatial filters applied with coefficients is the newly generated spatial filter, where i=0, 1, 2, . . . , M−1. The relay node relays a signal between the first network element and the second network element by using the target spatial filter $$\sum_{i=1}^{M-1} kc_i V_i.$$

k is a real number.

For another example, the relay node generates a target spatial filter V, where V is formed by combining the spatial filters $V_i$ with the coefficient $c_i$, where i=0, 1, 2, . . . , M−1. V is a vector, of which an element represents a weight applied to a working unit in the relay node.

In an embodiment, the indication information includes M spatial filters.

In this embodiment, the indication information can be used to indicate a coefficient of the M spatial filters of the relay node, and can also be used to indicate M spatial filters $V_0, V_1, \ldots, V_{M-1}$. The relay node generates a target spatial filter according to a coefficient indicated by the indication information and M spatial filters $V_0, V_1, \ldots, V_{M-1}$, and relays a signal between the first network element and the second network element by using the target spatial filter.

In an embodiment, the indication information is also used to indicate a generation manner of the target spatial filter.

In this embodiment, there are two main generation manners: one is to perform processing on each spatial filter according to a coefficient of each spatial filter, where the processed spatial filters together constitute the target spatial filter; the other is to combine the M spatial filters according to the coefficient of each spatial filter, so as to obtain the target spatial filter.

In an embodiment, the signal relay method further includes step 102: reporting a generation manner of the target spatial filter that is supported, to the first network element.

In this embodiment, before receiving the indication information, the relay node also reports, to the first network element, the generation manner of the target spatial filter that is supported. The relay node may support multiple manners of generating the target spatial filter. The first network element indicates a manner of generating the target spatial filter in the indication information, and the relay node generates the target spatial filter according to the generation manner indicated by the first network element.

In an embodiment, one case is that the first network element knows generation manners of the target spatial filter supported by the relay node, and selects one or more generation manners of the generation manners and indicates the one or more generation manners to the relay node; another case is that the relay node reports generation manners of the target spatial filter supported by the relay node to the first network element, and the first network element selects one or more generation manners of from generation manners of the target spatial filter supported by the relay node according to the reporting of the relay node, and indicates the one or more generation manners to the relay node.

In an embodiment, the signal relay method further includes step 104: reporting a spatial location information of the M spatial filters to the first network element; where the spatial location information includes at least one of: a spacing of working units corresponding to the M spatial filters; and an angular interval of pointing directions of the M spatial filters.

In this embodiment, before receiving the indication information, the relay node also reports the following content to the first network element: spatial location information of the M spatial filters; where the spatial location information includes at least one of: 1) a spacing of working units of the relay node, where the M spatial filters relay a signal between the first network element and the second network element through the working units; 2) an angular interval between the pointing directions of the M spatial filters.

In an embodiment, one case in which the M spatial filters relay a signal between the first network element and the second network element through the working units is that: each spatial filter is a vector, an element of each spatial filter is a weight added to a working unit, and one element corresponds to one working unit; another case is that: one spatial filter uses one working unit to relay a signal between the first network element and the second network element. A spacing of the working units is a spacing of the working units in one of two cases.

An angular interval between the pointing directions of the M spatial filters is reported. For example, it is to report an interval between the pointing directions of M spatial filters in a first spatial dimension; it may also be to report an interval between the pointing directions of the M spatial filters in the first spatial dimension and an interval between the pointing directions of M spatial filters in a second spatial dimension.

In an embodiment, the coefficient is a real number. In this embodiment, the coefficient indicated by the indication information is a real number, that is, a coefficient applied to the spatial filter is a real number. The real number has no imaginary part, and compared to a coefficient being a complex number, using a real number as a coefficient reduces the complexity of generating target spatial filters to relay a signal.

In an embodiment, the coefficient includes a specific coefficient for each spatial filter and a common coefficient for the M spatial filters.

In this embodiment, the M spatial filters are denoted as $V_0, V_1, \ldots V_i, \ldots, V_{M-1}$, respectively, and the specific coefficients of the M spatial filters are denoted as $c_0, c_1, \ldots c_i, \ldots, c_{M-1}$, respectively, and the coefficient $c_i$ corresponds to the spatial filter $V_i$. The specific coefficients of different spatial filters may be the same or different; the common coefficient of the M spatial filter is denoted as k, which k is a real number. The M spatial filters applied with coefficients are expressed as $kc_0V_0, kc_1V_1, \ldots, kc_{M-1}V_{M-1}$, respectively; the relay node generates the target spatial filter according to the M spatial filters $kc_0V_0, kc_1V_1, \ldots, kc_{M-1}V_{M-1}$ applied with coefficients, where i=0, 1, 2, . . . , M−1.

In an embodiment, the common coefficient is a reciprocal of a square root of a sum of a square of a modulus of the specific coefficients of the M spatial filters.

In this embodiment, the common coefficient k is a real number and k is equal to a reciprocal of a square root of the sum of the square of the modulus of $c_0, c_1, \ldots, c_{M-1}$, that is $$k = 1/\sqrt{\sum_{i=0}^{M-1} |c_i|^2},$$

thereby maintaining the power of the relayed signal and ensuring the quality of the relayed signal. Multiple coefficients are used to combine M spatial filters to generate a target spatial filter, where $$\sum_{i=0}^{M-1} kc_i V_i$$

is a generated target spatial filter, $V_0, V_1, \ldots, V_{M-1}$ are the M spatial filters, $c_0, c_1, \ldots, c_{M-1}$ are the specific coefficients of the M spatial filters indicated by the indication information, k is equal to a reciprocal of a square root of a sum of the square of the modulus of $c_0, c_1, \ldots, c_{M-1}$.

The embodiments of the present disclosure further provide an indicating method. This method can be applied to the first network element, such as an access point, a base station, or a network element with a relay function, etc. The signal between the first network element and the second network element needs to be relayed by a relay device.

FIG. 2 is a flowchart of an indicating method provided by an embodiment.

As shown in FIG. 2, the method provided by this embodiment includes step 210 and step 220.

In step 210, the coefficient of M spatial filters used to generate a target spatial filter is determined, where the target spatial filter is used to relay a signal between the first network element and the second network element, and M is an integer greater than 1.

In step 220, the indication information is transmitted, where the indication information is used to indicate a coefficient of the M spatial filters.

In this embodiment, the relay node has M spatial filters, and the first network element transmits indication information to the relay node to indicate a coefficient of M spatial filters. The relay node receives the indication information of the first network element, and generates a target spatial filter applied with a coefficient accordingly, and uses the generated target spatial filter to relay a signal between the first network element and the second network element. The target spatial filter applied with a coefficient is a spatial filter pointing in a new direction relative to the M spatial filters. The first network element indicates the coefficient of the M spatial filters, and the relay node generates a spatial filter pointing in the new direction according to the indication information. Therefore, the target spatial filter concentrates the energy of transmitting a signal or receiving a signal on the second network element, which can avoid interference to or from network elements in other directions.

One way that the indication information indicates the coefficient of the M spatial filters is that the indication information includes a coefficient of the M spatial filters. For example, the indication information includes M coefficients, where each coefficient corresponds to a spatial filter. Another way that the indication information indicates the coefficient of the M spatial filters is that the indication information includes a coefficient reference value and a coefficient relative value of the M spatial filters, and a coefficient of each spatial filter is an operation result of a corresponding coefficient relative value corresponding to the respective spatial filter and a coefficient reference value.

The indicating method of this embodiment provides a reliable basis for the relay node to generate the target spatial filter by indicating the coefficient of the spatial filters, such that the relay node has an ability to control a spatial distribution of energy of a signal, thereby improving the energy efficiency and reliability of signal relay.

In an embodiment, the indication information is also used to indicate N spatial filters from M spatial filters, where N is a non-negative integer less than or equal to M; a coefficient of a spatial filter except the N spatial filters among the M spatial filters is a first default value; a coefficient of the N spatial filters is a second default value or a specified values of the first network element.

In an embodiment, the first default value is zero.

In an embodiment, the indicating method further includes step 200: receiving a number of to-be-indicated spatial filters reported by the relay node.

In an embodiment, the indication information includes a coefficient reference value and a coefficient relative value corresponding to each spatial filter.

In an embodiment, the coefficient reference value is associated with one of: a power of the target spatial filter; a power amplification factor of the target spatial filter to the signal; a power of each spatial filter of the M spatial filters; a power sum of the M spatial filters.

In an embodiment, the indication information includes M spatial filters.

In an embodiment, the indication information is also used to indicate a generation manner of the target spatial filter.

In an embodiment, the indicating method further includes step 202: receiving a generation manner of the target spatial filter that is supported and reported by the relay node.

In an embodiment, the indicating method further includes step 204: receiving spatial location information of the M spatial filters reported by the relay node; the spatial location information includes at least one of: a spacing of working units corresponding to the M spatial filters; and an angular interval of pointing directions of the M spatial filters.

In an embodiment, a coefficient of each spatial filter is a real number.

In an embodiment, the coefficient of the M spatial filters includes a specific coefficient for each spatial filter and a common coefficient for the M spatial filters.

In an embodiment, the common coefficient is a reciprocal of a square root of a sum of a square of a modulus of the specific coefficients of the M spatial filters.

An embodiment of the present disclosure further provides a signal relay apparatus. FIG. 3 is a structural schematic diagram of a signal relay apparatus provided by an embodiment. As shown in FIG. 3, the signal relay apparatus includes: a generating module 310, configured to generate a target spatial filter according to received indication information, where the indication information is used to indicate a coefficient of M spatial filters, and M is an integer greater than 1; and a relay module 320, configured to relay a signal between a first network element and a second network element through the target spatial filter.

The signal relay apparatus of this embodiment transmits or receives a signal by generating a target spatial filter, such that the relay node has an ability to control a spatial distribution of energy of a signal, and concentrate the energy of transmitting or receiving a signal during the relay process on the second network elements, which can avoid interference to or from network elements in other directions, thereby improving the energy efficiency and reliability of signal relay.

In an embodiment, the indication information is also used to indicate N spatial filters from M spatial filters, where N is a non-negative integer less than or equal to M; where a coefficient of a spatial filter except the N spatial filters among the M spatial filters are a first default value; a coefficient of the N spatial filters is a second default values or the specified values of the first network element.

In an embodiment, the first default value is zero.

In an embodiment, the apparatus further includes: a first reporting module, configured to report a number of to-be-indicated spatial filters to the first network element.

In an embodiment, the indication information includes a coefficient reference value and a coefficient relative value corresponding to each spatial filter.

In an embodiment, the coefficient reference value is associated with one of: a power of the target spatial filter; a power amplification factor of the target spatial filter to the signal; a power of each of the M spatial filters; a power sum of the M spatial filters.

In an embodiment, the generating module 310 is configured to: perform processing on each spatial filter according to the coefficient of each spatial filter, where the processed M spatial filters jointly constitute the target spatial filter.

In an embodiment, the generating module 310 is configured to: combine the M spatial filters according to the coefficient of each spatial filter, so as to obtain the target spatial filter.

In an embodiment, the indication information includes M spatial filters.

In an embodiment, the indication information is also used to indicate a generation manner of the target spatial filter.

In an embodiment, the apparatus further includes: a second reporting module, configured to report a generation manner of the target spatial filter that is supported to the first network element.

In an embodiment, the apparatus further includes: a third reporting module, configured to report spatial location information of the M spatial filters to the first network element; the spatial location information includes at least one of: a spacing of working units corresponding to M spatial filters; and an angular interval of pointing directions of the M spatial filters.

In an embodiment, a coefficient of each spatial filter is a real number.

In an embodiment, the coefficient of M spatial filters includes a specific coefficient of each spatial filter and a common coefficient of the M spatial filters.

In an embodiment, the common coefficient is the reciprocal of the square root of the sum of the square of the modulus of the specific coefficients of the M spatial filters.

The signal relay apparatus provided in this embodiment and the signal relay method provided in the above embodiments belong to the same invention concept.

Technical details that are not described in detail in this embodiment can be referred to any of the above embodiments, and this embodiment has the same effect as executing the signal relay method.

An embodiment of the present disclosure further provides an indicating apparatus.

FIG. 4 is a structural schematic diagram of an indicating apparatus provided by an embodiment. As shown in FIG. 4, the indicating apparatus includes: a coefficient determining module 410, configured to determine a coefficient of M spatial filters used to generate a target spatial filter, where the target spatial filter is used to relay a signal between a first network element and a second network element, where M is an integer greater than 1; and an indicating module 420, configured to transmit indication information, where the indication information is used to indicate the coefficient of the M spatial filters.

The indicating apparatus of this embodiment provides a reliable basis for the relay node to generate the target spatial filter by indicating the coefficient of the spatial filters, such that the relay node has an ability to control a spatial distribution of energy of a signal, thereby improving the energy efficiency of signal relay and reliability.

In an embodiment, the indication information is also used to indicate N spatial filters from M spatial filters, where N is a non-negative integer less than or equal to M; where a coefficient of a spatial filter except the N spatial filters among the M spatial filters is a first default value; a coefficient of the N spatial filters is a second default value or a specified values of the first network element.

In an embodiment, the first default value is zero.

In an embodiment, the indicating apparatus further includes a first receiving module, configured to receive a number of to-be-indicated spatial filters reported by the relay node.

In an embodiment, the indication information includes a coefficient reference value and a coefficient relative value corresponding to each spatial filter.

In an embodiment, the coefficient reference value is associated with one of: a power of the target spatial filter; a power amplification factor the target spatial filter to the signal; a power of each spatial filter of the M spatial filters; a power sum of the M spatial filters.

In an embodiment, the indication information includes M spatial filters.

In an embodiment, the indication information is also used to indicate a generation manner of the target spatial filter.

In an embodiment, the indicating apparatus further includes a second receiving module, configured to receive a generation manner of the target spatial filter that is supported to the first network element.

In an embodiment, the indicating apparatus further includes a third receiving module, configured to receive spatial location information of the M spatial filters reported by the relay node; where the spatial location information includes at least one of: a spacing of working units corresponding to the M spatial filters; and an angular interval of pointing directions of the M spatial filters.

In an embodiment, a coefficient of each spatial filter is a real number.

In an embodiment, the coefficients of M spatial filters includes a specific coefficient of each spatial filter and a common coefficient of the M spatial filters.

In an embodiment, the common coefficient is the reciprocal of the square root of the sum of the square of the modulus of the specific coefficients of the M spatial filters.

The indicating apparatus provided in this embodiment and the indicating method provided in the above embodiments belong to the same invention concept. Technical details not described in detail in this embodiment can be referred to any of the above embodiments, and this embodiment has the same effect as executing the signal relay method.

The embodiment of the present disclosure also provides a relay node. FIG. 5 is a schematic diagram of a hardware structure of a relay node provided by an embodiment.

As shown in FIG. 5, the relay node provided by the present disclosure includes a memory 520, a processor 510, and a computer program stored on the memory and runnable on the processor, the processor 510, upon executing the program, implements the signal relay method as described above.

There may be one or more processors 510 in the relay node, and one processor 510 is taken as an example in FIG. 5. The memory 520 is configured to store one or more programs; when the one or more programs are executed by the one or more processors 510, the one or more processors 510 implement the signal relay method as recited in the embodiments of the present disclosure.

The relay node also includes: a communication means 530, an input means 540, and an output means 550.

The processor 510, the memory 520, the communication means 530, the input means 540 and the output means 550 in the relay node may be connected via a bus or in other ways, and the connection via the bus is taken as an example in FIG. 5.

The input means 540 may be configured to receive input digital or character information, and generates a keyboard signal input related to user settings and function control of the relay node. The output means 550 may include a display device such as a display screen.

The communication means 530 may include a receiver and a transmitter. The communication means 530 is configured to transmit and receive information under the control of the processor 510.

The memory 520, as a computer-readable storage medium, may be configured to store software programs, computer-executable programs, and modules, such as program instructions/modules corresponding to the signal relay method in the embodiments of the present disclosure (for example, the generating module 310, the relay module 320 in the signal relay apparatus). The memory 520 may include an area for storing program and an area for storing data, where the area for storing program may store the operating system, an application program required by at least one function; the area for storing data can store data created according to the usage of the relay node and the like. In addition, the memory 520 may include a high-speed random access memory, and may also include a non-volatile memory, such as at least one magnetic disk storage device, a flash memory device, or other non-volatile solid state storage devices. In some examples, the memory 520 may further include memories located remotely with respect to the processor 510, and these remote memories may be connected to the relay node via a network. Instances of the network include, but are not limited to, the Internet, an intranet, a local area network, a mobile communication network, and combinations thereof.

An embodiment of the present disclosure also provides a first network element.

Figure 6:
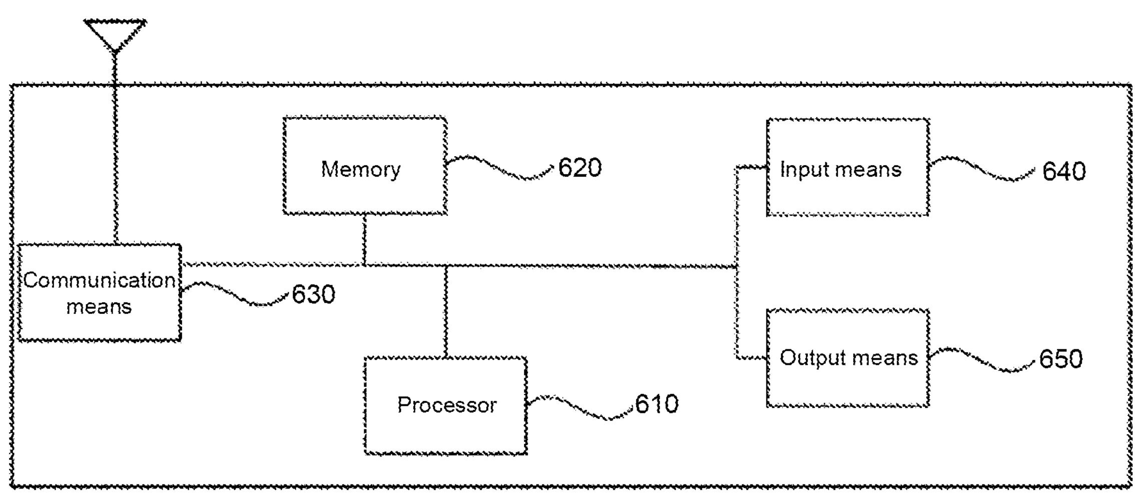
FIG. 6 is a schematic diagram of a hardware structure of a first network element provided by an embodiment.

FIG. 6 is a schematic diagram of hardware structure of a first network element provided by an embodiment. As shown in FIG. 6, the network element provided by the present disclosure includes a memory 620, a processor 610 and a computer program stored in the memory and runnable on the processor, the processor 610, upon executing the program, implements the instruction method as described above.

The network element may also include a memory 620; there may be one or more processors 610 in the network element, and take one processor 610 as an example in FIG. 6; the memory 620 is configured to store one or more programs; the one or more programs are executed by the one or more processors 610, the one or more processors 610 implement the instruction method as recited in the embodiment of the present disclosure.

The network element also includes: a communication means 630, an input means 640 and an output means 650.

The processor 610, the memory 620, the communication means 630, the input means 640, and the output means 650 in the network element may be connected via a bus or in other ways, and the connection via the bus is taken as an example in FIG. 6.

The input means 640 may be configured to receive input digital or character information, and generate keyboard signal input related to user settings and function control of the device. The output means 650 may include a display device such as a display screen.

The communication means 630 may include a receiver and a transmitter. The communication means 630 is configured to send and receive information under the control of the processor 610.

The memory 620, as a computer-readable storage medium, may be configured to store software programs, computer-executable programs, and modules, such as program instructions/modules corresponding to the indicating method in the embodiments of the present disclosure (for example, a coefficient determining module 410 and transmission module 420 in the indicating apparatus). The memory 620 may include an area for storing program and an area for storing data where the area for storing program may store the operating system, an application program required by at least one function; the area for storing data area can store data created according to the usage of the network element and the like. In addition, the memory 620 may include a high-speed random access memory, and may also include a non-volatile memory, such as at least one magnetic disk storage device, a flash memory device, or other non-volatile solid state storage devices. In some examples, the memory 620 may further include memories located remotely with respect to the processor 610, and these remote memories may be connected to the network element via a network. Instances of the network include, but are not limited to, the Internet, an intranet, a local area network, a mobile communication network, and combinations thereof.

The embodiments of the present disclosure also provide a storage medium, where the storage medium has stored thereon a computer program, and the computer program, upon being executed by a processor, implements the signal relay method or the indicating method as any one of as recited in the embodiments of the present disclosure.

The relay method includes: generating a target spatial filter according to received indication information, where the indication information is used to indicate a coefficient of M spatial filters, and M is an integer greater than 1; and relaying a signal between a first network element and a second network element through the target spatial filter. The indicating method includes: determining a coefficient of M spatial filters used to generate a target spatial filter, where the target spatial filter is used to relay a signal between a first network element and a second network element, and M is an integer greater than 1; and transmitting indication information, where the indication information is used to indicate the coefficient of the M spatial filters.

The computer storage medium in the embodiment of the present disclosure may be any combination of one or more computer-readable mediums. The computer-readable medium may be a computer-readable signal medium or a computer-readable storage medium. The computer-readable storage medium may be, for example, but is not limited to:

an electronic, magnetic, optical, electromagnetic, infrared, or semiconductor system, apparatus or device, or any combination thereof. More specific examples (non-exhaustive list) of computer-readable storage medium include: electrical connections having one or more wires, portable computer disks, hard drives, random access memories (RAM), read-only memories (ROM), erasable programmable read-only memories (EPROM), flash memories, optical fibers, portable read-only optical disk storage devices (Compact Disc Read-Only Memory, CD-ROM), magnetic memory device, or any suitable combination of the above. A computer-readable storage medium may be any tangible medium that contains or stores a program for use by or in connection with an instruction execution system, apparatus, or device.

A computer-readable signal medium may include a data signal propagated in baseband or as part of a carrier carrying computer-readable program code therein. Such propagated data signals may take many forms, including but not limited to: electromagnetic signals, optical signals, or any suitable combination of the above. A computer-readable signal medium may also be any computer-readable medium other than a computer-readable storage medium. The computer-readable medium can send, propagate, or transmit a program for use by or in connection with an instruction execution system, apparatus, or device.

The program code contained on a computer-readable medium can be transmitted using any suitable medium, including but not limited to: wireless, wire, fiber optic cable, radio frequency (RF), etc., or any suitable combination of the above.

Computer program code for performing operations of the present disclosure may be written in one or more programming languages, including object-oriented programming languages such as Java, Smalltalk, C++, and conventional procedural programming language, such as the "C" language or similar programming language. The program code may execute entirely on the user's computer, partly on the user's computer, as a separate software package, partly on the user's computer, and partly on a remote computer or entirely on the remote computer or server. In situations involving remote computers, the remote computer can be connected to the user's computer by any kind of networks, including a Local Area Network (LAN) or a Wide Area Network (WAN), or it can be connected to an external computer (e.g. using an Internet service provider to connect via the Internet).

The foregoing is merely exemplary embodiments of the present disclosure, and is not intended to limit the scope of protection of the present disclosure.

Those skilled in the art will understand that the term "user terminal" covers any suitable type of wireless user equipment, such as a mobile phone, a portable data processing apparatus, a portable web browser, or a vehicle-mounted mobile station.

In general, various embodiments of the present disclosure may be implemented in hardware or special-purpose circuits, software, logic or any combination thereof. For example, in some aspects, the embodiments may be implemented in hardware, while in other aspects, the embodiments may be implemented in hardware or software which may be executed by a controller, a microprocessor, or other computing device, although the present disclosure is not limited thereto.

The embodiments of the present disclosure may be implemented by a data processor of a mobile apparatus executing computer program instructions, for example, in a processor entity, or by hardware, or by a combination of software and hardware.

Computer program instructions may be assembly instructions, instruction set architecture (ISA) instructions, machine instructions, machine-related instructions, microcode, firmware instructions, state setting data, or source code or object code written in any combination of one or more programming languages.

The block diagram of any logic process in the drawings of the present disclosure may represent program steps, or may represent interconnected logic circuits, modules, and functions, or may represent a combination of program steps, logic circuits, modules, and functions. Computer programs may be stored on the memory. The memory may be of any type suitable for the local technical environment and may be implemented by using any suitable data storage technology, which, for example, includes but is not limited to ROM, RAM, or optical memory device and system (digital video disk (DVD) or compact disk (CD)). The computer-readable medium may include a non-transitory storage medium.

The data processor may be of any type suitable to the local technical environment, such as, but not limited to, a general purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A signal relay method, comprising:

generating a target spatial filter according to received indication information, wherein the indication information is used to indicate a coefficient of M spatial filters, and Mis an integer greater than 1; and relaying a signal between a first network element and a second network element through the target spatial filter; wherein the coefficient of the M spatial filters comprises a specific coefficient of each spatial filter of M spatial filters and a common coefficient of the M spatial filters.

2. The method according to claim 1, wherein the indication information comprises indicating N spatial filters out of the M spatial filters, and Nis a non-negative integer less than or equal to M;

wherein a coefficient of a spatial filter except the N spatial filters among the M spatial filters is a first default value; and a coefficient of the N spatial filters is a second default value or a specified value of the first network element.

3. The method according to claim 2, wherein the first default value is zero.

4. The method according to claim 2, further comprising:

reporting a number of to-be-indicated spatial filters to the first network element.

5. The method according to claim 1, wherein the indication information comprises a coefficient reference value and a coefficient relative value corresponding to each spatial filter of M spatial filters.

6. The method according to claim 5, wherein the coefficient reference value is associated with one of:

a power of the target spatial filter;

a power amplification factor of the target spatial filter to a signal;

a power of each spatial filter in the M spatial filters; and a sum of a power of the M spatial filters.

7. The method according to claim 1, wherein generating the target spatial filter according to the received indication information comprises:

performing processing on each spatial filter of M spatial filters according to a coefficient of the each spatial filter of M spatial filters, wherein the M spatial filters that have been processed jointly constitute the target spatial filter.

8. The method according to claim 1, wherein generating the target spatial filter of M spatial filters according to the received indication information comprises:

combining the M spatial filters according to a coefficient of each spatial filter of M spatial filters, so as to obtain the target spatial filter.

9. The method according to claim 1, wherein the indication information comprises the M spatial filters.

10. The method according to claim 1, wherein the indication information is further used to indicate a generation mode of the target spatial filter.

11. The method according to claim 10, further comprising:

reporting the generation mode of the target spatial filter that is supported, to the first network element.

12. The method according to claim 10, further comprising:

reporting spatial location information of the M spatial filters to the first network element;

wherein the spatial location information comprises at least one of: a spacing between working units corresponding to the M spatial filters; and an angular interval of pointing directions of the M spatial filters.

13. The method according to claim 1, wherein a coefficient of each spatial filter of M spatial filters is a real number.

14. The method according to claim 1, wherein the common coefficient is a reciprocal of a square root of a sum of a square of a modulus of a specific coefficient of the M spatial filters.

15. A non-transitory computer-readable storage medium storing a computer program, wherein the program, upon being executed by a processor, implements the signal relay method according to claim 1.

16. An indicating method, comprising:

determining a coefficient of M spatial filters used to generate a target spatial filter, wherein the target spatial filter is used to relay a signal between a first network element and a second network element, and Mis an integer greater than 1; and transmitting indication information, wherein the indication information is used to indicate the coefficient of the M spatial filters; wherein the coefficient of the M spatial filters comprises a specific coefficient of each spatial filter of M spatial filters and a common coefficient of the M spatial filters.

17. A first network element, comprising a memory, a processor, and a computer program stored on the memory and runnable on the processor, the processor, upon executing the program, implements the indicating method according to claim 16.

18. A non-transitory computer-readable storage medium storing a computer program, wherein the program, upon being executed by a processor, implements the indicating method according to claim 16.

19. A relay node, comprising a memory, a processor, and a computer program stored on the memory and runnable on the processor, the processor, upon executing the program, implements steps of:

generating a target spatial filter according to received indication information, wherein the indication information is used to indicate a coefficient of M spatial filters, and Mis an integer greater than 1; and relaying a signal between a first network element and a second network element through the target spatial filter; wherein the coefficient of the M spatial filters comprises a specific coefficient of each spatial filter of M spatial filters and a common coefficient of the M spatial filters.

* * * * *